(12) United States Patent
Woo et al.

(10) Patent No.: US 12,441,356 B2
(45) Date of Patent: Oct. 14, 2025

(54) LANE STITCHING METHODS AND SYSTEMS FOR ROBUST AUTOMATED DRIVING CONTROL

(71) Applicant: GM GLOBAL TECHNOLOGY OPERATIONS LLC, Detroit, MI (US)

(72) Inventors: Ami Woo, Markham (CA); Tushita Arun Sikder, Windsor (CA); Amirreza Mirbeygi Moghaddam, Toronto (CA); Mohammadali Shahriari, Markham (CA); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 18/058,094

(22) Filed: Nov. 22, 2022

(65) Prior Publication Data
US 2024/0166232 A1    May 23, 2024

(51) Int. Cl.
*G06V 20/56* (2022.01)
*B60W 40/02* (2006.01)
*B60W 40/06* (2012.01)
*B60W 60/00* (2020.01)

(52) U.S. Cl.
CPC ......... *B60W 60/001* (2020.02); *G06V 20/588* (2022.01); *B60W 2420/403* (2013.01); *B60W 2552/00* (2020.02)

(58) Field of Classification Search
CPC .......... B60W 60/001; B60W 2552/00; B60W 2420/403; G06V 20/588
See application file for complete search history.

(56) References Cited

U.S. PATENT DOCUMENTS

| | | | |
|---|---|---|---|
| 2014/0229106 A1* | 8/2014 | Ishikawa | G06V 20/20 701/533 |
| 2014/0343907 A1* | 11/2014 | Gamet | G08G 5/51 703/2 |
| 2020/0073396 A1* | 3/2020 | Shimizu | G05D 1/0219 |
| 2021/0304462 A1* | 9/2021 | Dorum | G05D 1/0274 |
| 2023/0296400 A1* | 9/2023 | Tsukamoto | G01C 21/3815 701/450 |
| 2023/0391336 A1* | 12/2023 | Sohn | B60W 30/18159 |

* cited by examiner

*Primary Examiner* — Scott A Browne
*Assistant Examiner* — Rami Nabih Bedewi
(74) *Attorney, Agent, or Firm* — Ingrassia Fisher & Lorenz, LLP | IF&L

(57) ABSTRACT

A system and method are provided for controlling a vehicle. In one embodiment, a system includes: a sensor system configured to generate sensor data sensed from an environment of the vehicle; and a control module configured to, by a processor, based on the sensor data, identify a gap in a lane line on a roadway in front of the vehicle, determine at least two points within the gap, determine a curve between the at least two points, compute a correlation measure based on the curve, generate lane stitching data based on data based on the curve and an evaluation of the correlation measure, and controlling one or more components of the vehicle based on the stitching data.

20 Claims, 7 Drawing Sheets

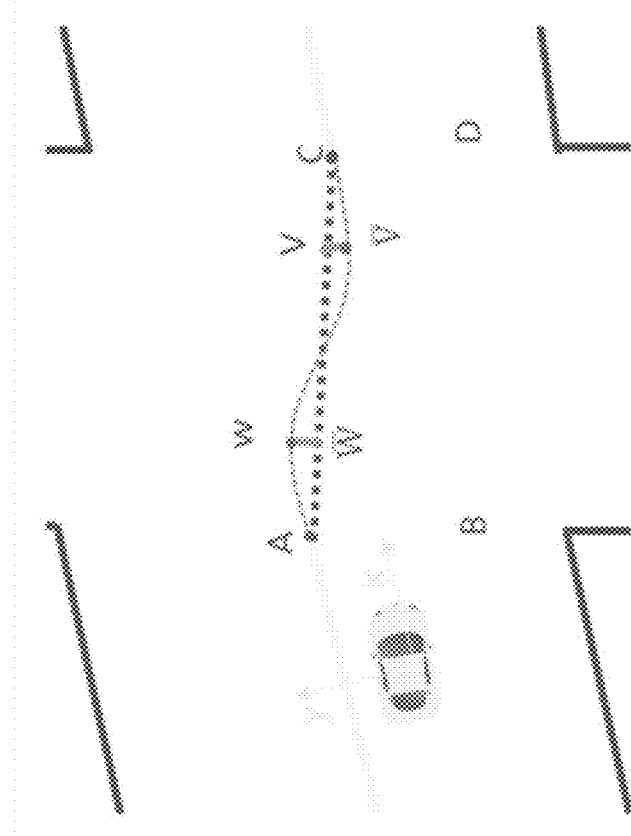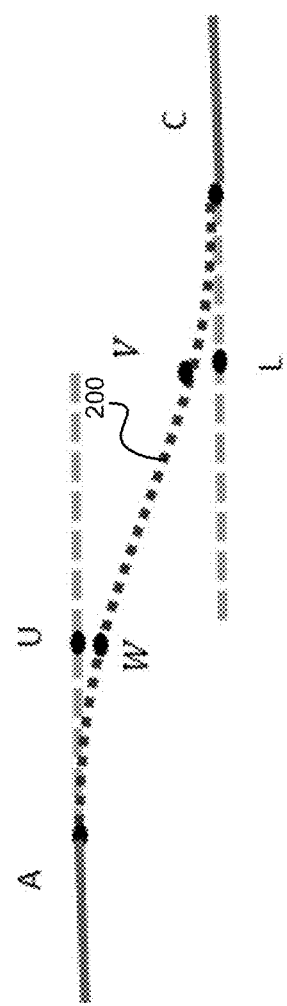
FIG. 8
FIG. 9

LANE STITCHING METHODS AND SYSTEMS FOR ROBUST AUTOMATED DRIVING CONTROL

TECHNICAL FIELD

This technical field generally relates to autonomous driving systems for vehicles, and more particularly, relates to methods and systems for stitching virtual lane information perceived from an environment of a vehicle having an autonomous driving system.

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable for improved operation of autonomous vehicles. For example, when lane lines along a roadway are intermittent and/or present irregular gaps, autonomous feature availability may be disrupted.

Accordingly, it is desirable to provide methods and systems for stitching virtual lane markings through the gaps. Other desirable features and characteristics of the herein described embodiments will become apparent from the subsequent detailed description and the appended claims, taken in conjunction with the accompanying drawings and the foregoing technical field and background.

SUMMARY

In various embodiments, systems and methods are provided for controlling a vehicle. In one embodiment a system includes: a sensor system configured to generate sensor data sensed from an environment of the vehicle; and a control module configured to, by a processor, based on the sensor data, identify a gap in a lane line on a roadway in front of the vehicle, determine at least two points within the gap, determine a curve between the at least two points, compute a correlation measure based on the curve, generate lane stitching data based on the correlation measure, and controlling one or more components of the vehicle based on the stitching data.

In various embodiments, the sensor system includes one or more front facing cameras of the vehicle.

In various embodiments, the control module is configured to determine the at least two points within the gap based on forward propagation and backward propagation of end points on the lane line.

In various embodiments, the control module is configured to determine the curve between the at least two points based on a Bezier curve computation.

In various embodiments, the control module is configured to generate the lane stitching data based on a Bezier to polynomial transformation.

In various embodiments, the control module is configured to compute the correlation measure based on points on the Bezier curve and points from a vector extending between end points on the lane line.

In various embodiments, the control module is configured to identify a plurality of lane lines, identify the gap between the plurality of lane lines, sort the plurality of lane lines into a first group consisting of lane lines before the gap, and a second group consisting of lane lines after the gap.

In various embodiments, the control module is configured to determine the at least two points and the curve for each lane line pair from the first group and the second group.

In various embodiments, the control module is configured to compute the correlation measure for each lane line pair, and wherein the control module is configured to generate the stitching data based on the curve of the lane line pair that has a highest correlation measure.

In various embodiments, the control module is configured to generate the lane stitching data when a plurality of conditions are met, where in the plurality of conditions include at least one of: a determined lateral difference in the lines is within a range of a lane width, a quality of the lane line is acceptable, a center lane is detected, a lane marking type for the lane line is consistent, a distance of the gap is less than a maximum distance.

In another embodiment, a method includes: receiving, by a processor, sensor data sensed from an environment of the vehicle; processing, by the processor, the sensor data to identify a gap in a lane line on a roadway in front of the vehicle; determining, by the processor, at least two points within the gap; determining, by the processor, a curve between the at least two points; computing, by the processor, a correlation measure based on the curve; generating, by the processor, lane stitching data based on the curve and an evaluation of the correlation measure; and controlling one or more components of the vehicle based on the stitching data.

In various embodiments, the sensor system includes one or more front facing cameras of the vehicle.

In various embodiments, the determining the at least two points includes determining the at least two points within the gap based on forward propagation and backward propagation of end points on the lane line.

In various embodiments, the determining the comprises determining the curve between the at least two points based on a Bezier curve computation.

In various embodiments, the generating includes generating the lane stitching data based on a Bezier to polynomial transformation.

In various embodiments, the computing includes computing the correlation measure based on points on the Bezier curve and points from a vector extending between end points on the lane line.

In various embodiments, the method further includes identifying a plurality of lane lines, identifying the gap between the plurality of lane lines, sorting the plurality of lane lines into a first group consisting of lane lines before the gap, and a second group consisting of lane lines after the gap.

In various embodiments, the method further includes determining the at least two points and the curve for each lane line pair from the first group and the second group.

In various embodiments, the method further includes computing the correlation measure for each lane line pair, and generating the stitching data based on the curve of the lane line pair that has a highest correlation measure.

In various embodiments, generating the lane stitching data occurs when a plurality of conditions are met, where in the plurality of conditions include at least one of: a determined lateral difference in the lines is within a range of a lane width, a quality of the lane line is acceptable, a center lane is detected, a lane marking type for the lane line is consistent, a distance of the gap is less than a maximum distance.

DESCRIPTION OF THE DRAWINGS

The exemplary embodiments will hereinafter be described in conjunction with the following drawing figures, wherein like numerals denote like elements, and wherein:

FIGS. 6, 7, 8, and 9 are illustrations of computed values in relation to the lane information in accordance with various embodiments.

DETAILED DESCRIPTION

Figure 1:
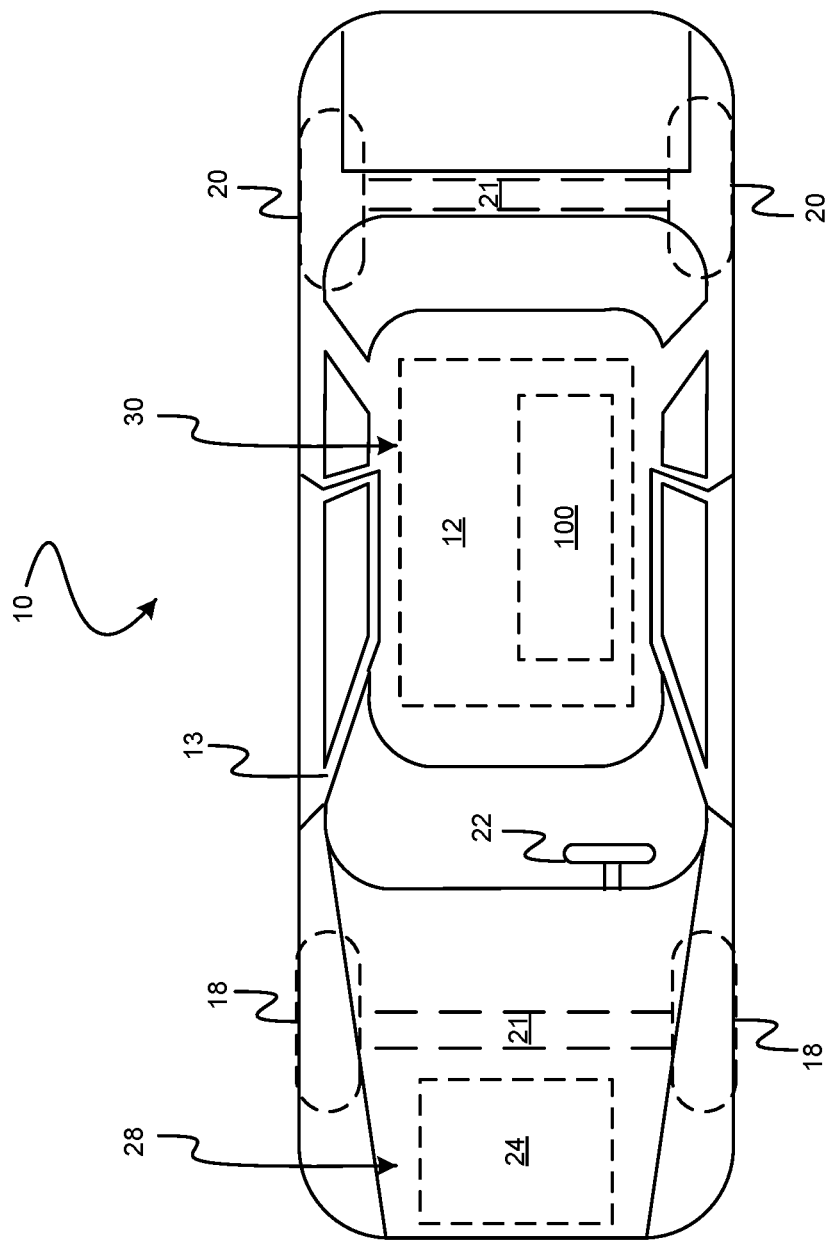
FIG. 1 is an illustration of a top perspective schematic view of a vehicle having a lane stitching system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that contains one or more executable software or firmware programs and associated data, a combinational logic circuit, and/or other suitable components that provide the described functionality.

Embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components, e.g., towing apparatus, indicators, or telltales; and electrical components, e.g., integrated circuit components, memory elements, digital signal processing elements, logic elements, look-up tables, imaging systems and devices or the like, which may carry out a variety of functions under the control of one or more microprocessors or other control devices. In addition, those skilled in the art will appreciate that the herein described embodiments may be practiced in conjunction with any number of mechanical and/or electronic systems, and that the vehicle systems described herein are merely exemplary.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

FIG. 1 is an illustration of a top view of a vehicle shown generally at 10 equipped with a lane stitching system shown generally at 100 in accordance with various embodiments. As will be discussed in more detail below, a lane stitching system 100 generally identifies a gap in lane markings of a roadway and stitches virtual lane lines where the actual lane markings are missing. The lane stitching system 100 generally formulates lane line extrapolation through a systematic lane line characteristic extraction, and using a correlation method for lane line segments to effectively identify the host vehicle's virtual lane along with the lane gaps. In various embodiments, the lane stitching system 100 uses a lane stitching mathematical model and an optimization problem to effectively assign the correct lane segments. In various embodiments, the lane stitching system provides a new lane segment time alignment through a systematic transformation of the lane line to persevere the representation format of reported lane lines from other systems.

As shown in the example of FIG. 1, the vehicle 10 generally includes a body 13, front wheels 18, rear wheels 20, a suspension system 21, a steering system 22, and a propulsion system 24. The wheels 18-20 are each rotationally coupled to the vehicle 10 near a respective corner of the body 13. The wheels 18-20 are coupled to the body 13 via the suspension system 21. The wheels 18 and/or 20 are driven by the propulsion system 24. The wheels 18 are steerable by the steering system 22.

The body 13 is arranged on or integrated with a chassis (not shown) and substantially encloses the components of the vehicle 10. The body 13 is configured to separate a powertrain compartment 28 (that includes at least the propulsion system 24) from a passenger compartment 30 that includes, among other features, seating (not shown) for one or more occupants of the vehicle 10. As used herein, the components "underneath" the vehicle 10 are components disposed below the body 13, such as, but not limited to, the wheels 18 and 20 (including their respective tires), and the suspension system 21.

In various embodiments, the vehicle 10 is an autonomous vehicle that includes an autonomous driving system 12. The autonomous driving system 12 that is automatically controls the vehicle 10 to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), towed vehicles, etc. can also be used. In an exemplary embodiment, the autonomous driving system 12 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In various embodiments, the lane stitching system 100 is implemented as a part of the autonomous driving system 12.

Figure 2:
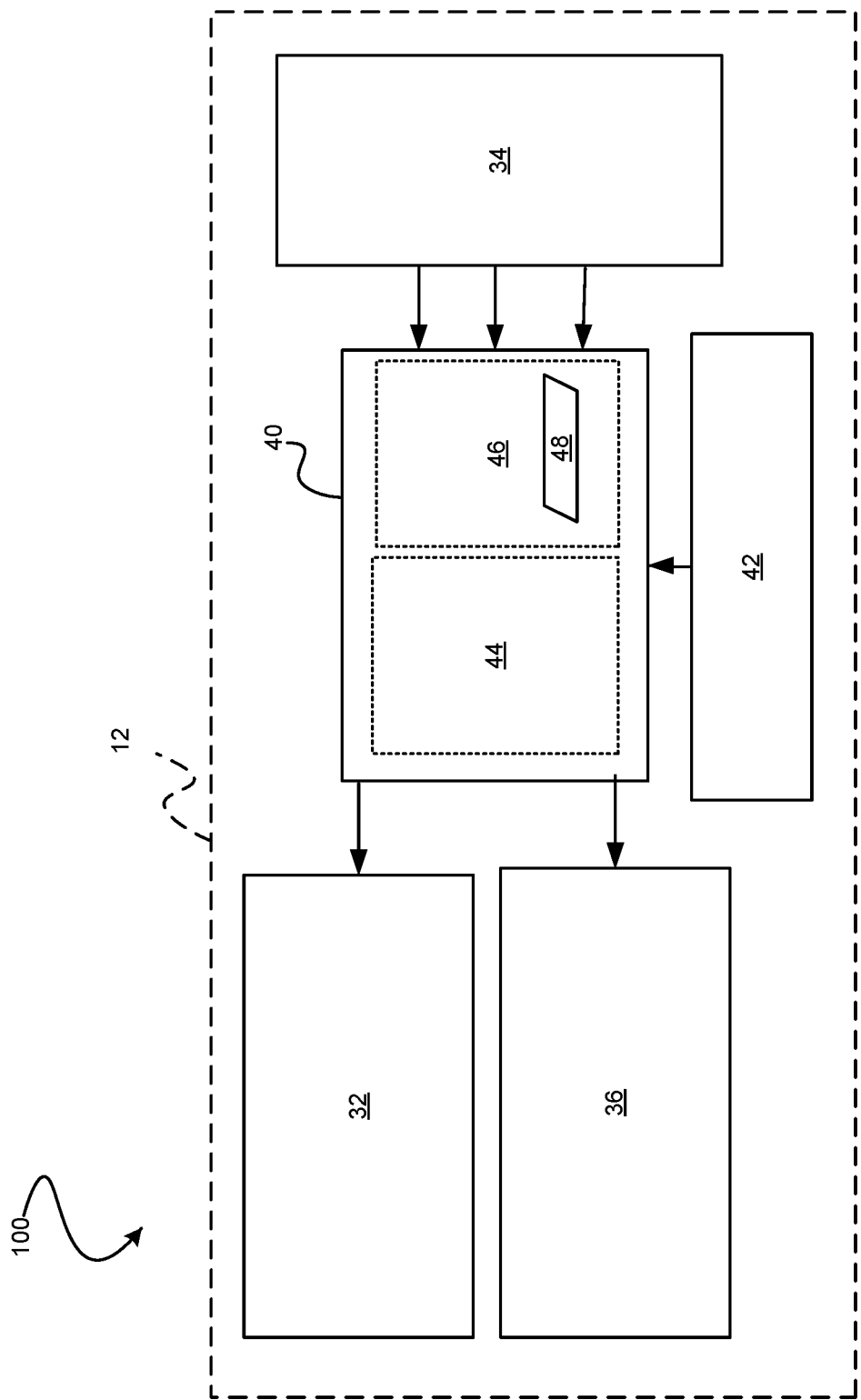
FIG. 2 is a functional block diagram illustrating an autonomous driving system of the vehicle and having the lane stitching system in accordance with various embodiments.

As shown in FIG. 2 and with continued reference to FIG. 1, the autonomous driving system 12 generally includes a sensor system 34, an actuator system 36, a display system 38, at least one control module 40, and a communication system 42.

The sensor system 34 includes one or more sensing devices that sense observable conditions of the exterior environment and/or the interior environment of vehicle 10. The sensing devices can include, but are not limited to, radars, lidars, global positioning systems, optical cameras, thermal cameras, ultrasonic sensors, and/or other sensors. The actuator system 36 includes one or more actuator devices that control one or more vehicle features such as, but not limited to, the propulsion system 24, the steering system 22, and/or the brake system 26. In various embodiments, the vehicle features can further include interior and/or exterior vehicle features such as, but are not limited to, doors, a trunk, and cabin features such as air, music, lighting, etc. (not numbered).

The communication system 42 is configured to communicate information to and from other entities, such as but not limited to, other modules of the vehicle (a communication bus), and/or to other vehicles ("V2V" communication,) infrastructure ("V2I" communication), remote systems, and/or personal devices. In an exemplary embodiment, the communication system 42 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The control module 40 includes at least one processor 44 and a computer readable storage device or media 46. The processor 44 can be any custom made or commercially available processor, a central processing unit (CPU), a graphics processing unit (GPU), an auxiliary processor among several processors associated with the control module 40, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control module 40 in controlling the vehicle 10.

The instructions may include one or more separate programs, each of which comprises an ordered listing of executable instructions for implementing logical functions. The instructions, when executed by the processor 44, receive and process signals from the sensor system 34, perform logic, calculations, methods and/or algorithms for automatically controlling the components of the vehicle 10, generate control signals to the actuator system 36 to automatically control the components of the vehicle 10 based on the logic, calculations, methods, and/or algorithms, and/or generate display signals to the display system 32 to display one or more features of the environment and/or messages to a user of the vehicle 10. Although only one control module 40 is shown in FIG. 2, embodiments of the vehicle 10 can include any number of control modules 40 that communicate over any suitable communication medium or a combination of communication mediums and that cooperate to process the sensor signals, perform logic, calculations, methods, and/or algorithms, and generate control signals and/or display signals to automatically control features of the vehicle 10.

In various embodiments, as discussed in detail below, one or more instructions 48 of the control module 40 are embodied in the lane stitching system 100 and, when executed by the processor 44, identify gaps between lane markings on a roadway and stitch virtual lane markings within the gaps in order to automatically control the vehicle 10 and/or generate display content for the display system 32.

Figure 3:
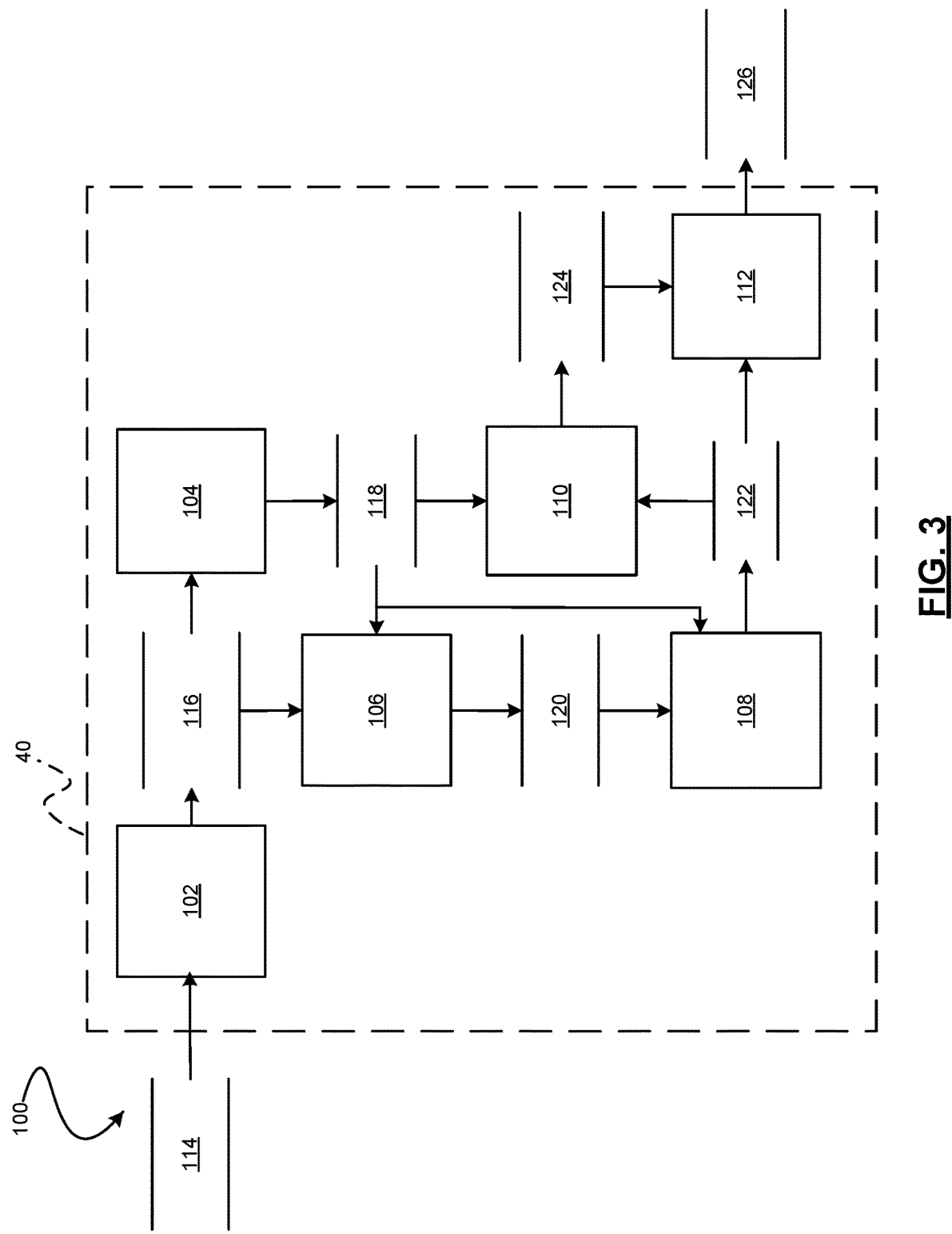
FIG. 3 is a dataflow diagram illustrating a control module of the lane stitching system in accordance with various embodiments.

Referring now to FIG. 3 and with continued reference to FIGS. 1-2, a dataflow diagram illustrates various embodiments of the control module 40 in greater detail. Various embodiments of the control module 40 according to the present disclosure may include any number of sub-modules. As can be appreciated, the sub-modules shown in FIG. 2 may be combined and/or further partitioned to similarly generate lane marking information for use in autonomously controlling the vehicle 10 and/or displaying lane information to a user of the vehicle 10. Inputs to the control module 40 may be received from the sensor system 34, received from other control modules (not shown) of the vehicle 10, and/or determined by other sub-modules (not shown) of the control module 40. In various embodiments, the control module 40 includes an identification module 102, a sorting module 104, a conditions evaluation module 106, a curve generation module 108, a correlation module 110, and a stitching module 112.

Figure 4:
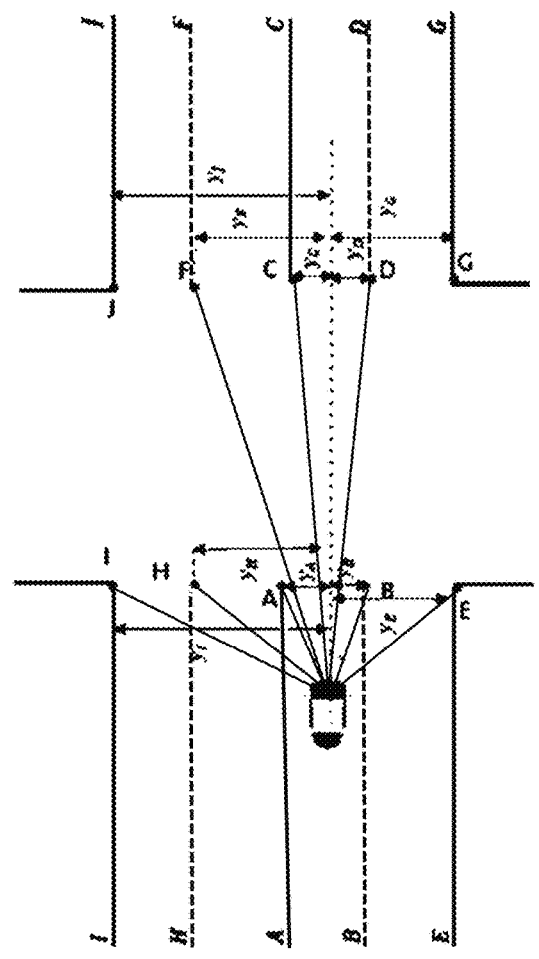
FIGS. 4 and 5 are top down views of lane information in accordance with various embodiments.
Figure 5:
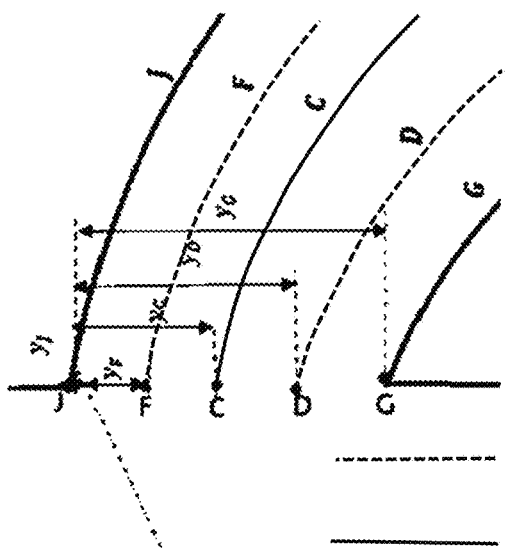

In various embodiments, the identification module 102 receives as input sensor data 114 from the sensor system 34 including, for example, camera data obtained from a front facing camera of the vehicle 10. As shown in FIGS. 4 and 5, the camera data includes a view of the environment in front of the vehicle 10 including a roadway with a number of different lane lines or markings where the lane lines have an identified gap. As can be appreciated, stitching of the present disclosure can be performed for identified gaps on a straight road as shown in FIG. 4 and identified gaps on a curved road as shown in FIG. 5. In various embodiments, the sensor data 114 further includes preprocessed sensor data that identifies the lane markings/lines (A, B, C, D, E, F, G, H, I), lane line types (center lane line, side lane line, etc.), longitudinal position data (x_A, x_B, x_C, etc.), lane quality data, etc.

In various embodiments, from the sensor data 114, X sets of coefficients for each lane line X lane lines (A, B, C, etc.) are identified. The coefficients correspond to a polynomial in vehicle frame, for instance:

$$y_A = c_0^A + c_1^A x_A + c_2^A x_A^2 + c_3^A x_A^3.$$

The identification module 103 identifies the lateral information (y_A, y_B y_C, etc.) using the polynomials. The identification module 103 identifies lane line position relative to the road and other lanes using polynomial geometries. The identification module 102 assembles the received and identified information into lane line information 116 for each identified line [A, B, C, D, E, F, G, H, I] in the view.

In various embodiments, the sorting module 104 receives as input the lane line information 116. The sorting module 104 sorts the lane line information 116 into at least two groups, for example, a before gap group and an after gap group. In various embodiments, the sorting module 104 sorts the line information based on an end point position of the lines and the lateral position of the lines. For example, the sorting module 104 sorts the identified lines [A, B, C, D, E, F, G, H, I] into a first group including the before gap lines [A, B, E, H, I] and a second group including the after gap lines [C, D, F, G, J]. In another example, the sorting module 104 sorts the first group by an order of lateral position of the lines identified in the first group(SBI)=[I, H, A, B, E], and sorts the second group by an order of lateral position of the lines in the second group (SAI)=[J, F, C, D, G]. The sorting module 104 generates sorted lane line data 118 based on the two sorted groups. In various embodiments, the sorted lane line data incorporates all possible candidate pairs for stitching, APP={[A, J], [A, F], [A, C], [A, D], [A, G]; [B, J], [B, F], [B, C], [B, D], [B, G], ... , [E, G]}.

In various embodiments, the conditions evaluation module 106 receives as input the lane line information 116, and the sorted lane line data 118. The conditions evaluation module 106 sets a stitching lane line ready flag 120 based on one or more conditions that evaluate the received data 116, 118. For example, the conditions evaluation module 106 sets the stitching lane line ready flag 120 to TRUE when all of the following conditions hold true: a determined lateral difference in the lines (y_C−y_D) is within a range of a lane width, a quality of the lane line is acceptable, a center lane is detected, a lane marking type for the lane line is consistent, a distance of the gap is less than a maximum distance. In another example, the stitching lane data ready flag 120 to FALSE when at least one of the conditions 1-4 is not true.

In various embodiments, the curve generation module 108 receives as input the sorted lane line data 118, and the stitching lane line ready flag 120. When the stitching lane line ready flag is TRUE, the curve generation module 108 begins the stitching of the lane by first generating virtual points within the identified gap between each lane line pair identified from the first group and the second group.

Figure 6:
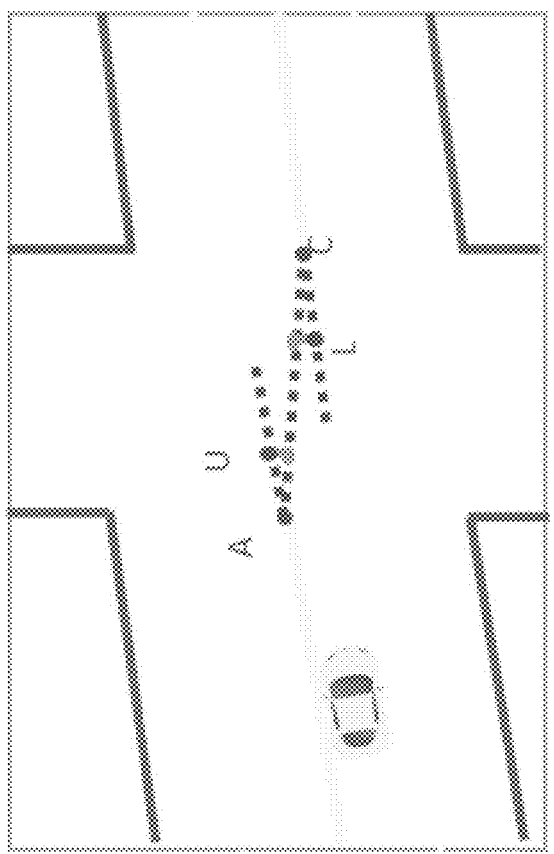

For example, as shown in FIG. 6, a point U indicating a quarter of distance (x-axis) on the line of forward propagation before the gap between a lane line pair [A, C] may be computed as:

$$x_U = \frac{(x_C - x_A)}{4} + x_A,$$

and $y_U = c_0^A + c_1^A x_U + c_2^A x_U^2 + c_3^A x_U^3,$ where A includes the end point of left lane line before the intersection, and C includes the start point of lane line C after the intersection.

In another example, a point indicating a quarter of distance (x-axis) on the line of backward propagation before the gap may be computed as:

$$x_L = x_C - \frac{(x_C - x_A)}{4},$$

and $y_L = c_0^C + c_2^C x_L + c_2^C x_L^2 + c_3^C x_L^3,$ where A includes the end point of left lane line before the intersection, and C includes the start point of lane line C after the intersection.

Figure 7:
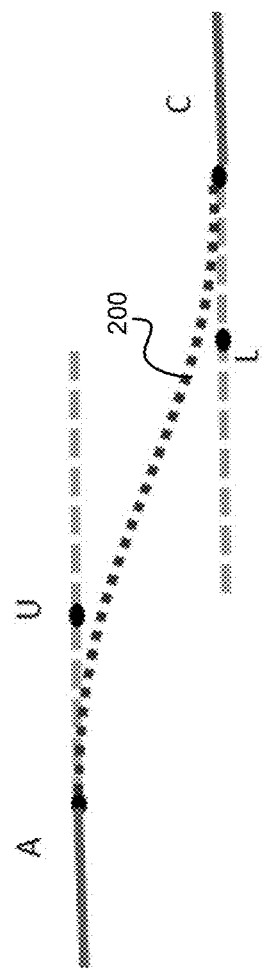

As shown in FIG. 7, from the two points (U, L), a curve 200 can be obtained for the lane line pair [A, C], using, for example, a cubic Bezier curve stitching as:

$$S = (1-t)^3 A + 3t(1-t)^2 U + 3t^2(1-t)L + t^3 C, \text{ for } 0 \leq t \leq 1$$

$$\text{curvature} = \frac{\det(S', S'')}{\|S'\|^3}.$$

As can be appreciated, having U and L closer to the end points generates a curve that has a similar behavior to the corresponding lines while maintaining smooth transition between the two lines. As can further be appreciated, using a Bezier curve produces a lane line that is tangent to both ends of the lines. In various embodiments, the curve generation module 108 repeats the point and curve computation for each of the lane line pairs and generates curve data 122 based thereon.

With reference back to FIG. 3, in various embodiments, the correlation module 110 receives as input the curve data 122 for each lane line pair. The correlation module 110 computes a correlation measure 124 for each lane line pair. For example, as shown in FIGS. 8 and 9, the correlation measure 124 can be computed for the lane line pair [A, C] as:

$$CM_{AC} = \exp^{\sigma_{AC} - \frac{\left[\sqrt{(y_{\overline{W}} - y_W)^2 + (x_{\overline{W}} - x_W)^2} + \sqrt{(y_{\overline{V}} - y_V)^2 + (x_{\overline{V}} - x_V)^2}\right]}{x_A - x_C}} (y_A - y_C)^2,$$

where W and V are points on the Bezier curve 200 at time-variable t=0.25 and t=0.75, respectively, $\overline{W}$ and $\overline{V}$ are points on the Vector extending from A to C, and σ is the sorting slack variable defined as follows, $$\sigma_{AC} = \begin{cases} 0 & (\text{size } (SBI) == \text{size}(SAI) \text{ and } SBI[A] == SAI[C]) \\ -K_\sigma & \text{else} \end{cases},$$

where $K_\sigma$ is a calibratable constant.

As can be appreciated, using the Bezier curve as a point of reference for determining the correlation of the pair of lane lines translates in its formulation the closeness of the behavior of the pair of lane lines. As can further be appreciated, the highest correlation measure between a set of candidate pairs represents the stitching curve that best connects the two most correlated lines before and after the gap. In various embodiments, the correlation module 110 computes the correlation measure for each lane line pair and generates correlation measure data 124 based thereon.

With reference back to FIG. 3, in various embodiments, the stitching module 112 receives as input the curve data 122 and the correlation measure data 124. The stitching module 112 selects the lane line pair with the highest correlation measure value. The stitching module 112 transforms the curve data 122 for the selected lane line pair from Bezier form to polynomial form, for example, as:

$$y_S = c_0^S + c_1^S x_S + c_2^S x_S^2 + c_3^S x_C^3.$$

In various embodiments, coefficients of the polynomial can be derived using the following 4×4 relations:

$$y_A = c_0^S + c_1^S x_A + c_2^S x_A^2 + c_3^S x_A^3 \qquad \qquad 1:$$

$$y_W = c_0^S + c_1^S x_W + c_2^S x_W^2 + c_3^S x_W^3 \qquad \qquad 2:$$

$$y_V = c_0^S + c_1^S x_V + c_2^S x_V^2 + c_3^S x_V^3 \qquad 3:$$

$$y_C = c_0^S + c_1^S x_C + c_2^S x_C^2 + c_3^S x_C^3 \qquad 4:$$

The resulting points are used to construct the stitched lane line data 126 which may be used by to control the vehicle 10 and/or display content via the actuator system 36 and/or the display system 32 of the vehicle 10.

Figure 10:
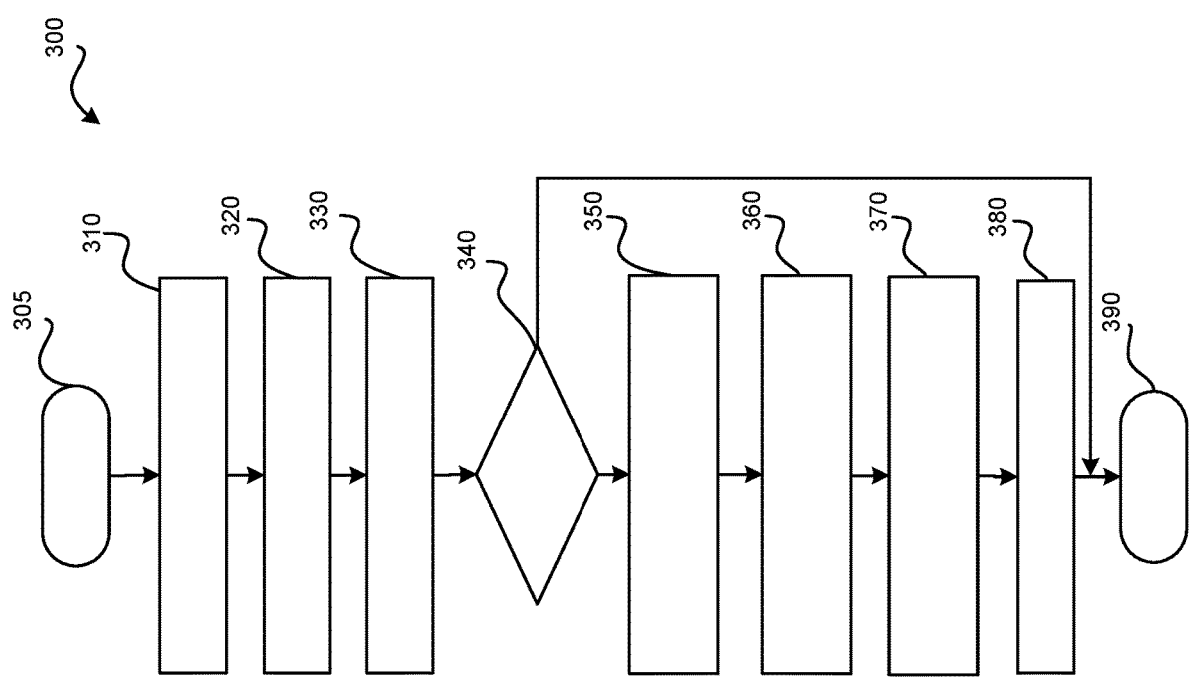
FIG. 10 is a flowchart illustrating a method of lane stitching in accordance with various embodiments.

Referring now to FIG. 10, and with continued reference to FIGS. 1-3 a flowchart illustrates a method 300 that can be performed by the lane stitching system 100 in accordance with various embodiments. As can be appreciated in light of the disclosure, the order of operation within the method 300 is not limited to the sequential execution as illustrated in FIG. 10 but may be performed in one or more varying orders as applicable and in accordance with the present disclosure. As can further be appreciated, the method 300 may be scheduled to run at predetermined time intervals during operation of the vehicle 10 and/or may be scheduled to run based on predetermined events.

In one example, the method 300 may begin at 305. The sensor data 114, including but not limited to road geometry data, lane marker type data, lane quality data, longitudinal lane information, and path information is received at 310. Thereafter, lane line identification is performed at 320 and sorting of the lane lines is performed at 330.

The lane stitching conditions are then verified at 340. For example, the following conditions are verified: 1. y_C–y_D is with a range of the lane width (to ensure that only corresponding lane to AB is selected), 2. the quality of the identified lanes lines are acceptable, 3. the center lane (lane dividing traffic going opposite directions) is detected, the lane marking types for the identified stitching lanes (A, C and B, D) are consistent, and 4. the distance of the gap (d) is less than a maximum acceptable distance. When at least one of the conditions are not met at 340, the method 300 may end at 390.

When all of the conditions are met at 340, the method 300 continues with lane stitching at 350-370. For example, curve determination using, for example, the Bezier curve is performed for each lane line pair at 350, correlation measure is computed for each lane line pair at 360. The lane line pair with the highest correlation measure is selected at a transformation from the Bezier form to the polynomial form is performed at 370. Thereafter, the stitched lane information is provided at 380 to one or more control modules and/or display modules where the information is used in controlling the vehicle 10 and/or displaying information to a user. Thereafter, the method 300 may end at 390.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling a vehicle, comprising:
a sensor system configured to generate sensor data sensed from an environment of the vehicle, via one or more sensors of the vehicle; and a control module configured to, by a processor that is coupled to the one or more sensors of the vehicle, based on the sensor data, identify a gap in a lane line on a roadway in front of the vehicle, determine at least two points within the gap, determine a curve between the at least two points, compute a correlation measure based on the curve based on a distance between points on the curve, generate lane stitching data based on the curve and an evaluation of the correlation measure, and controlling one or more components of the vehicle based on the stitching data, wherein the control module is further configured to generate the lane stitching data based on a plurality of conditions, including when a determined lateral difference in the lines is within a predetermined lane width range and when a distance of the gap is less than a predetermined maximum gap distance, wherein the control module is further configured to:

identify a plurality of lane lines, identify the gap between the plurality of lane lines, sort the plurality of lane lines into a first group consisting of lane lines before the gap, and a second group consisting of lane lines after the gap; and compute the correlation measure for each lane line pair, and wherein the control module is configured to generate the stitching data based on the curve of the lane line pair that has a highest correlation measure, wherein each lane line pair comprises one or more pairs of coordinate which may be grouped together to form a pair such that they may be used in conjunction with one another for further calculations.

2. The system of claim 1, wherein the control module is configured to determine the at least two points within the gap based on forward propagation and backward propagation of end points on the lane line, wherein the forward propagation comprises interpolating an interpolated point in between the at least two points, and wherein the backward propagation comprises interpolating a coordinate between the at least two points.

3. The system of claim 1, wherein the control module is configured to determine the curve between the at least two points based on a Bezier curve computation.

4. The system of claim 3, wherein the control module is configured to generate the lane stitching data based on a Bezier to polynomial transformation.

5. The system of claim 3, wherein the control module is configured to compute the correlation measure based on points on the Bezier curve and points from a vector extending between end points on the lane line.

6. The system of claim 1, wherein the control module is configured to determine the at least two points and the curve for each lane line pair from the first group and the second group.

7. The system of claim 1, wherein the control module is configured to generate the lane stitching data when each of the plurality of conditions are met, namely: when the determined lateral difference in the lines is within the predetermined lane width range, a quality of the lane line is acceptable, a center lane is detected, a lane marking type for the lane line is consistent, and the distance of the gap is less than the predetermined maximum gap distance.

8. The system of claim 5, wherein the processor of the control module is configured to compute the correlation measure based on points on the Bezier curve and points from the vector (V) extending between end points (A) and (C) on the lane line further for the lane line pair [A, C] further in accordance with the following equation:

$$CM_{AC} = \exp^{\sigma_{AC} - \frac{\left[\sqrt{(y_{\overline{W}} - y_W)^2 + (x_{\overline{W}} - x_W)^2} + \sqrt{(y_{\overline{V}} - y_V)^2 + (x_{\overline{V}} - x_V)^2}\right]}{x_A - x_C}} (y_A - y_C)^2,$$

wherein W and V are points on the Bezier curve at time-variable t=0.25 and t=0.75, respectively, $\overline{W}$ and $\overline{V}$ are points on the vector extending from A to C, and σ is the sorting slack variable defined as follows, $$\sigma_{AC} = \begin{cases} 0 & (\text{size}(SBI) == \text{size}(SAI) \text{ and } SBI[A] == SAI[C]) \\ -K_\sigma & \text{else} \end{cases},$$

wherein $K_\sigma$ is a calibratable constant.

9. The system of claim 1, wherein the vehicle comprises an autonomous vehicle.

10. The system of claim 3, wherein the control module is configured to:
generate the lane stitching data based on a Bezier to polynomial transformation; and
compute the correlation measure based on points on the Bezier curve and points from a vector extending between end points on the lane line.

11. A method for controlling a vehicle, comprising:
receiving, by a processor of a vehicle, sensor data sensed from an environment of the vehicle via one or more sensors of the vehicle that are coupled to the processor;
processing, by the processor, the sensor data to identify a gap in a lane line on a roadway in front of the vehicle;
determining, by the processor, at least two points within the gap;
determining, by the processor, a curve between the at least two points;
computing, by the processor, a correlation measure based on the curve;
generating, by the processor, lane stitching data based on the curve and an evaluation of the correlation measure based on a plurality of conditions, including when a determined lateral difference in the lines is within a predetermined lane width range and when a distance of the gap is less than a predetermined maximum gap distance; and
controlling one or more components of the vehicle based on the stitching data; and wherein the method further comprises:
identifying a plurality of lane lines, identifying the gap between the plurality of lane lines, sorting the plurality of lane lines into a first group consisting of lane lines before the gap, and a second group consisting of lane lines after the gap; and
computing the correlation measure for each lane line pair, and generating the stitching data based on the curve of the lane line pair that has a highest correlation measure, wherein each lane line pair comprises one or more pairs of coordinate which may be grouped together to form a pair such that they may be used in conjunction with one another for further calculations.

12. The method of claim 11, wherein the determining the at least two points comprises determining the at least two points within the gap based on forward propagation and backward propagation of end points on the lane line, wherein the forward propagation comprises interpolating an interpolated point in between the at least two points, and wherein the backward propagation comprises interpolating a coordinate between the at least two points.

13. The method of claim 11, wherein the determining the comprises determining the curve between the at least two points based on a Bezier curve computation.

14. The method of claim 13, wherein the generating comprises generating the lane stitching data based on a Bezier to polynomial transformation.

15. The method of claim 13, wherein the computing comprises computing the correlation measure based on points on the Bezier curve and points from a vector extending between end points on the lane line.

16. The method of claim 11, wherein the control module is configured to determine the at least two points and the curve for each lane line pair from the first group and the second group.

17. The method of claim 11, wherein generating the lane stitching data occurs when each of the plurality of conditions are met, namely: when the determined lateral difference in the lines is within the predetermined lane width range, a quality of the lane line is acceptable, a center lane is detected, a lane marking type for the lane line is consistent, and the distance of the gap is less than the predetermined maximum gap distance.

18. The method of claim 13, wherein the computing comprises computing the correlation measure via the processor based on points on the Bezier curve and points from the vector (V) extending between end points (A) and (C) on the lane line further for the lane line pair [A, C] further in accordance with the following equation:

$$CM_{AC} = \exp^{\sigma_{AC} - \frac{\left[\sqrt{(y_{\overline{W}} - y_W)^2 + (x_{\overline{W}} - x_W)^2} + \sqrt{(y_{\overline{V}} - y_V)^2 + (x_{\overline{V}} - x_V)^2}\right]}{x_A - x_C}} (y_A - y_C)^2,$$

wherein W and V are points on the Bezier curve at time-variable t=0.25 and t=0.75, respectively, $\overline{W}$ and $\overline{V}$ are points on the vector extending from A to C, and σ is the sorting slack variable defined as follows, $$\sigma_{AC} = \begin{cases} 0 & (\text{size}(SBI) == \text{size}(SAI) \text{ and } SBI[A] == SAI[C]) \\ -K_\sigma & \text{else} \end{cases},$$

wherein $K_\sigma$ is a calibratable constant.

19. The method of claim 11, wherein the vehicle comprises an autonomous vehicle.

20. The method of claim 13, wherein:
the generating comprises generating the lane stitching data based on a Bezier to polynomial transformation; and
the computing comprises computing the correlation measure based on points on the Bezier curve and points from a vector extending between end points on the lane line.

* * * * *